Patented Oct. 5, 1926.

1,602,029

UNITED STATES PATENT OFFICE.

ARMAND KREMPF, OF PARIS, FRANCE, ASSIGNOR TO SOCIÉTÉ CIVILE D'ETUDES DES PRODUITS DE LA MER, OF PARIS, FRANCE, A CORPORATION OF FRANCE.

PROCESS OF TREATING PROTEIN MATERIAL.

No Drawing. Application filed November 26, 1923, Serial No. 677,188, and in France December 7, 1922.

Processes for effecting artificial digestion are known which are based on autolysis and in the course of which the activity of bacteria must be prevented or hindered by the use of sodium chloride at a concentration nearing saturation.

This method of proceeding has the following disadvantages:—

1. The high proportion of sea-salt in the nitrogenous derivatives produced as just stated, together with the complete impossibility of practically eliminating the said salt, has markedly limited the commercial use of such method, and for the same reason the products obtained cannot be used as foodstuffs but only as condiments. Moreover, the said products, also because of their excessive proportion of salt, cannot be used for therapeutical purposes or for feeding domestic animals.

2. The product obtained is heavy and cumbersome and requires time-robbing and costly treatments, because the proportion of salt therein is one-third of the total volume of the product.

3. Finally, the protection afforded by sea-salt as an antiseptic against bacterial activity is unsatisfactory, so that a portion of the albuminoid matter subjected to autolytic digestion is damaged and lost, since the process may go as far as the formation of ammoniacal substances and even of ammonia.

The process according to the present invention may be applied to protein matter whether of vegetable or of animal origin, and it serves to obviate the above-mentioned disadvantages and to lessen industrial difficulties arising therefrom. The process essentially consists in discarding sodium chloride as an antiseptic, replacing the same by easily eliminated antiseptic volatile substances used alone or in mixture, and eliminating these substances when artificial digestion is completed.

The following are some of the many antiseptic and easily eliminated substances which appear to be the most suitable for carrying out the present process:

Nitrochloroform, carbon tetrachloride, carbon disulphide, dichlorethylene, trichlorethylene, tetrachlorethylene, paraffin oil, light petroleum, petroleum ether, benzole, nitrobenzene, turpentine. The invention, of course, is not limited to the substances just enumerated, which moreover may be used alone or in mixture.

In the following description nitrochloroform is taken as an example of antiseptic volatile substance, the amount to be used varying in accordance with circumstances. By way of example, however, it may be stated that one litre of nitrochloroform precludes any bacterial action in a quantity of animal matter of about 400 to 600 kilograms. A practical method of carrying out the process is, preferably, first to crush or divide the material to be treated which is thereafter intimately mixed with nitrochloroform and stirred or agitated in and by any suitable means while digestion is proceeding. Gases being evolved in the course of digestion, adequate steps should be taken to deal with internal pressure in the apparatus used for treating the material. All other requirements of artificial digestion are of course to be observed, more particularly as regards temperature. The time within which the operation is completed varies in accordance with the final product to be obtained. The numerous nitrogenous products and the fatty substances formed or liberated in the course of this chemical procedure may be mechanically separated from each other by filtration, drying, decantation, centrifuging, or a combination of these methods of separation. The separated products may be divided into four main groups which, mentioned in decreasing order of density, may be briefly characterized as follows:

(1) Animal skeleton matter (when the the material treated is of animal origin) the tissues of which have been subjected to artificial digestion; coarse solid material not transformed by the latter; and salts (phosphates) liberated by the said digestion. This group of products may first and foremost be used as manure; it may also be used, for instance, in the manufacture of glue.

(2) Solid and very finely divided nitrogenous products. After separating the course matter mentioned under (1), the material is filtered and leaves behind an oily substance which is a valuable fish-oil, also termed degras, which may either be used straightaway from the filter for chamoising or other purposes or may be separated into its components by means of suitable solvents.

(3) Soluble nitrogenous products. A liquid product is obtained after separating the products mentioned under (1) and (2) and the fatty substances referred to hereinafter, the said product being perfectly clear after filtration and having a tint which varies from amber yellow to ruby. This product is subjected to low-temperature evaporation to eliminate most of the water contained therein and to produce, at the end of the operation, a pasty material most of the numerous components of which are in the crystallized state and among which are tyrosine, leucine, tryptophane, lysine, etc. The substances of this group are the most important of those yielded by the present process, as they are amino-acid substances the nutritive value of which may be well appreciated in the light of the outcome of recent physiological research work. The product now under consideration has a pleasing taste and may be used alone or combined with other nutritive elements. It may of course be used in the liquid state provided it is freed from nitrochloroform and preserved so that it is protected from any further fermentation.

(4) Fatty substances. A layer of fat or fatty substances floats on the layer of liquid after the various groups of substances are separated by decantation.

The complete elimination of nitrochloroform is carried out in three stages in the course of the above-described operations.

Stage $a$. Nitrochloroform being very soluble in fats, the largest proportion of the nitrochloroform contained in the artificially digested material is removed together with the upper layer.

Stage $b$. The products of (1), (2) and (3) are now subjected in thin layers to the action of a stream of air for the purpose of completely removing the vapours of nitrochloroform still retained by the said products after the fatty substances are separated.

Stage $c$. The nitrochloroform dissolved in the said fatty substances is separated therefrom by heating these substances to over 100° C.

Should a mixture of the antiseptic substances mentioned in the foregoing be used for carrying out the present process, the component substances of the mixture are advantageously proportioned so that the density of the said mixture is equal to that of the material artificially digested according to the present invention.

The proportion of antiseptic to be used may be, as an example, three to ten parts of antiseptic to one thousand parts of material to be treated, these proportions varying of course, in accordance with circumstances.

The antiseptic substances referred to in the foregoing may likewise be advantageously used, alone or in mixture, for preserving protein material before it is subjected to artificial digestion. This is of great value for instance as regards highly perishable material such as fish, more particularly in warm climates. The material may be stored for several months in a practical manner before it is subjected to proteolysis and worked to the final product. Whether the material is previously stored or not, these substances do not interfere in any way with the action of metallic catalyzers suitable for accelerating digestion. In their order of importance, catalyzers suitable for this purpose are nickel, ferro-cerium, iron, manganese.

The conditions of use of the said antiseptics or mixtures thereof and the nature of their action easily lend themselves to the general requirements for working the present process on an industrial scale. Moreover the presence of the said antiseptic substances is no impediment in the usual operations involved in the treatment of nitrogenous liquors: decoloration, fining, clarifying and so forth, which entail the use of materials such as de-colouring earths, fuller's earth, animal black, lime, tannins, sulphites, bisulphites, phospho-sulphites, hydro-sulphites.

Furthermore, the said antiseptic substances or mixtures thereof must be non-inflammable or at least difficultly inflammable so that they may be manipulated with safety on board a ship or anywhere else. To this end, the substances are accordingly treated in the course of their manufacture, or are mixed in suitable proportions, with an inert substance capable of raising their flash point, this substance being for example a mineral, animal or vegetable oil.

As previously stated, the above-described process may be applied to protein material of any origin. The chief advantages of the said process may be summed up as follows: A very small quantity of antiseptic substance may be used for a large quantity of material to be treated, the said substance being if necessary completely eliminated from the finished product. The substance moreover entirely prevents bacterial action from developing and assists diastasic action.

I claim as my invention:—

1. A process of making industrially utilizable nitrogenous derivatives and fatty substances by artificial digestion, comprising the steps of intimately mixing an easily-eliminated volatile antiseptic substance with the material undergoing treatment; thoroughly stirring the mixture from time to time as digestion proceeds; adding a metallic catalyzer promoting digestion; mechanically separating the different classes of products formed by digestion; and eliminating the volatile antiseptic substance therefrom.

2. A process of making industrially utilizable nitrogenous derivatives and fatty substances by artificial digestion, comprising the steps of intimately mixing an easily-eliminated volatile antiseptic substance with the material undergoing treatment; thoroughly stirring the mixture from time to time as digestion proceeds and adding thereto a metallic catalyzer promoting digestion; mechanically separating by drying and filtration the products formed by digestion and consisting of animal bone, solid nitrogenous products in a state of fine division, soluble nitrogenous products, and fatty substances; and subjecting each class of products to treatment to eliminate the volatile antiseptic substance therefrom.

3. A process of making industrially utilizable nitrogenous derivatives and fatty substances by artificial digestion, comprising the steps of intimately mixing nitrochloroform with the material undergoing treatment; thoroughly stirring the mixture from time to time as digestion proceeds; adding a metallic catalyzer promoting digestion; mecanically separating the different classes of products formed by digestion; and eliminating the nitrochloroform therefrom.

4. A process of making industrially utilizable nitrogenous derivatives and fatty substances by artificial digestion, comprising the steps of intimately mixing an easily-eliminated volatile antiseptic substance with the material undergoing treatment; thoroughly stirring the mixture from time to time as digestion proceeds; mechanically separating the different classes of products formed by digestion; and eliminating the volatile antiseptic substance therefrom.

5. A process of making industrially utilizable nitrogenous derivatives and fatty substances by artificial digestion, comprising the steps of intimately mixing an easily-eliminated volatile antiseptic substance with the material undergoing treatment; thoroughly stirring the mixture from time to time as digestion proceeds; mechanically separating by drying and filtration the products formed by digestion and consisting of animal bone, solid nitrogenous products in a state of fine division, soluble nitrogenous products, and fatty substances; and subjecting each class of products to treatment to eliminate the volatile antiseptic substance therefrom.

6. A process for the manufacture of nitrogenous products, comprising the steps of mixing an easily-removable volatile antiseptic substance with a product of animal origin and a proteolytic ferment; subjecting the mixture to heat at a moderate temperature so as to prevent destruction of said ferment and for a period long enough to effect auto-digestion; and separating the liquid portion of the resultant product from the solid residue.

7. A process for the manufacture of nitrogenous products, comprising the steps of mixing an easily-removable volatile antiseptic substance with a product of animal origin; subjecting the mixture to heat at a moderate temperature and for a period long enough to effect auto-digestion; and separating the liquid extract obtained thereby from the solid residue.

8. A process for the manufacture of nitrogenous products, comprising the steps of mixing an easily-removable volatile antiseptic substance with a product of animal origin; subjecting the mixture to heat at a moderate temperature and for a period long enough to effect auto-digestion; separating the liquid extract obtained thereby from the solid residue; and finally drying the liquid extract to powder form.

9. A process according to claim 8, in which the product of animal origin is crushed previous to being mixed with the antiseptic substance.

In testimony whereof I affix my signature.

ARMAND KREMPF.